(12) United States Patent
Conner

(10) Patent No.: US 7,246,923 B2
(45) Date of Patent: Jul. 24, 2007

(54) RESHAPING LIGHT SOURCE MODULES AND ILLUMINATION SYSTEMS USING THE SAME

(75) Inventor: Arlie R. Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 183 days.

(21) Appl. No.: 10/776,155

(22) Filed: Feb. 11, 2004

(65) Prior Publication Data

US 2005/0174771 A1 Aug. 11, 2005

(51) Int. Cl.
*F21V 7/00* (2006.01)
*F21V 7/04* (2006.01)
*F21S 8/00* (2006.01)
*F21S 8/10* (2006.01)

(52) U.S. Cl. .............. 362/309; 362/551; 362/268; 362/317

(58) Field of Classification Search .......... 362/800, 362/551, 555, 561, 227, 257, 268, 291, 317, 362/329, 331, 332, 309
See application file for complete search history.

(56) References Cited

U.S. PATENT DOCUMENTS

| | | | |
|---|---|---|---|
| 1,428,662 A | 9/1922 | Walter | |
| 1,451,893 A | 4/1923 | Walter | |
| 1,900,966 A | 3/1933 | Wolfe | |
| 1,932,817 A | 10/1933 | Gehrke | |
| 2,587,956 A | 3/1952 | Roy | |
| 3,756,688 A | 9/1973 | Hudson et al. | |
| 3,984,178 A | 10/1976 | Bergqvist | |
| 4,733,335 A * | 3/1988 | Serizawa et al. | 362/503 |
| 4,767,172 A * | 8/1988 | Nichols et al. | 385/146 |
| 4,852,980 A | 8/1989 | Shinichi | |
| 4,915,489 A | 4/1990 | Minko | |
| 4,941,072 A * | 7/1990 | Yasumoto et al. | 362/249 |
| 5,001,609 A * | 3/1991 | Gardner et al. | 362/555 |
| 5,055,892 A | 10/1991 | Gardner et al. | |
| 5,285,318 A | 2/1994 | Gleckman | |
| 5,398,086 A | 3/1995 | Nakano | |

(Continued)

FOREIGN PATENT DOCUMENTS

EP 0 083 527 7/1983

(Continued)

OTHER PUBLICATIONS

U.S. Appl. No. 10/727,220, filed Dec. 2, 2003, Schultz.

(Continued)

*Primary Examiner*—Renee Luebke
*Assistant Examiner*—Evan Dzierzynski
(74) *Attorney, Agent, or Firm*—Anna A. Wetzels; Jay R. Pralle

(57) ABSTRACT

Light source modules are disclosed, which include an emitter having a light-emitting surface and a pyramid collector mounted onto the emitter over the emitting surface. Also disclosed are illumination systems, including a plurality of light source modules, each light source module comprising an emitter having a light-emitting surface and a pyramid collector mounted onto the emitter over the emitting surface. The illumination systems further include an illumination target and a system of optical elements disposed between the at least one light source module and the illumination target.

39 Claims, 8 Drawing Sheets

U.S. PATENT DOCUMENTS

| | | | |
|---|---|---|---|
| 5,428,365 A | 6/1995 | Harris | |
| 5,442,414 A | 8/1995 | Janssen | |
| 5,506,929 A * | 4/1996 | Tai et al. | 385/146 |
| 5,557,353 A | 9/1996 | Stahl | |
| 5,592,188 A | 1/1997 | Doherty | |
| 5,625,738 A | 4/1997 | Magarill | |
| 5,633,737 A | 5/1997 | Tanaka | |
| 5,662,401 A | 9/1997 | Shimizu | |
| 5,719,706 A | 2/1998 | Masumoto | |
| 5,757,341 A | 5/1998 | Clarke | |
| 5,764,319 A | 6/1998 | Nishihara | |
| 5,782,553 A | 7/1998 | McDermott | |
| 5,796,526 A | 8/1998 | Anderson | |
| 5,839,823 A | 11/1998 | Hou | |
| 5,863,125 A | 1/1999 | Doany | |
| 5,900,981 A | 5/1999 | Oren | |
| 5,900,982 A | 5/1999 | Dolgoff | |
| 5,902,033 A * | 5/1999 | Levis et al. | 385/146 |
| 5,969,872 A | 10/1999 | Oren | |
| 5,971,545 A | 10/1999 | Haitz | |
| 5,987,793 A | 11/1999 | Ebine | |
| 5,997,150 A * | 12/1999 | Anderson | 362/227 |
| 6,028,694 A | 2/2000 | Schmidt | |
| 6,038,005 A * | 3/2000 | Handschy et al. | 349/61 |
| 6,061,183 A | 5/2000 | Nakai | |
| 6,102,552 A | 8/2000 | Tullis | |
| 6,104,458 A | 8/2000 | Fukuda | |
| 6,104,541 A | 8/2000 | Otomo | |
| 6,139,156 A | 10/2000 | Okamori et al. | |
| 6,144,426 A | 11/2000 | Yamazaki | |
| 6,177,761 B1 | 1/2001 | Pelka | |
| 6,196,699 B1 | 3/2001 | Stanton | |
| 6,201,629 B1 * | 3/2001 | McClelland et al. | 359/223 |
| 6,224,216 B1 | 5/2001 | Parker | |
| 6,227,669 B1 | 5/2001 | Tiao | |
| 6,236,512 B1 | 5/2001 | Nakai | |
| 6,252,636 B1 | 6/2001 | Bartlett | |
| 6,254,237 B1 | 7/2001 | Booth | |
| 6,280,058 B1 | 8/2001 | Horigome | |
| 6,318,863 B1 * | 11/2001 | Tiao et al. | 353/31 |
| 6,330,039 B2 | 12/2001 | Matsui | |
| 6,332,688 B1 | 12/2001 | Magarill | |
| 6,336,724 B1 | 1/2002 | Shoui et al. | |
| 6,341,867 B1 | 1/2002 | Itoh | |
| 6,398,389 B1 | 6/2002 | Bohler et al. | |
| 6,402,347 B1 | 6/2002 | Maas | |
| 6,412,953 B1 | 7/2002 | Tiao et al. | |
| 6,419,365 B1 | 7/2002 | Potekev et al. | |
| 6,459,835 B1 | 10/2002 | Nagaoka et al. | |
| 6,469,755 B1 | 10/2002 | Adachi | |
| 6,471,358 B1 | 10/2002 | Itoh et al. | |
| 6,478,453 B2 | 11/2002 | Lammers et al. | |
| 6,483,196 B1 | 11/2002 | Wojnarowski | |
| 6,491,443 B1 | 12/2002 | Serizawa et al. | |
| 6,499,863 B2 | 12/2002 | Dewald | |
| 6,505,939 B1 | 1/2003 | Bierhuizen et al. | |
| 6,527,419 B1 | 3/2003 | Galli | |
| 6,547,400 B1 | 4/2003 | Yokoyama | |
| 6,547,423 B2 | 4/2003 | Marshall | |
| 6,561,654 B2 | 5/2003 | Mukawa et al. | |
| 6,570,190 B2 | 5/2003 | Krames | |
| 6,591,037 B2 | 7/2003 | Yonekubo | |
| 6,595,648 B1 | 7/2003 | Woodgate et al. | |
| 6,623,122 B1 | 9/2003 | Yamazaki et al. | |
| 6,639,572 B1 | 10/2003 | Little | |
| 6,644,814 B2 | 11/2003 | Ogawa | |
| 6,646,806 B1 | 11/2003 | Bierhuizen | |
| 6,657,236 B1 | 12/2003 | Thibeault | |
| 6,672,724 B1 | 1/2004 | Peterson et al. | |
| 6,688,747 B2 | 2/2004 | Wichner et al. | |
| 6,698,893 B2 | 3/2004 | Takimoto et al. | |
| 6,726,329 B2 | 4/2004 | Li et al. | |
| 6,733,139 B2 | 5/2004 | Childers et al. | |
| 6,788,471 B2 | 9/2004 | Wagner | |
| 6,834,963 B2 | 12/2004 | Kim et al. | |
| 6,843,566 B2 | 1/2005 | Mihara | |
| 2001/0022613 A1 | 9/2001 | Matsui | |
| 2001/0033367 A1 * | 10/2001 | Karasawa et al. | 353/30 |
| 2001/0046131 A1 | 11/2001 | Hoelen | |
| 2001/0048493 A1 | 12/2001 | Swanson | |
| 2001/0048560 A1 | 12/2001 | Sugano | |
| 2002/0003636 A1 | 1/2002 | Conner | |
| 2002/0003669 A1 | 1/2002 | Kedar et al. | |
| 2002/0093743 A1 | 7/2002 | Miyamae | |
| 2002/0097000 A1 | 7/2002 | Muthu | |
| 2002/0105807 A1 | 8/2002 | Loughrey | |
| 2002/0114157 A1 | 8/2002 | Fu-Ming et al. | |
| 2002/0145708 A1 | 10/2002 | Childers et al. | |
| 2002/0154277 A1 | 10/2002 | Mukawa et al. | |
| 2002/0159036 A1 | 10/2002 | Yamagishi | |
| 2002/0186350 A1 | 12/2002 | Peterson | |
| 2002/0191395 A1 | 12/2002 | Fleury | |
| 2003/0016539 A1 | 1/2003 | Minano | |
| 2003/0043582 A1 | 3/2003 | Chan | |
| 2003/0133080 A1 | 7/2003 | Ogawa | |
| 2003/0147055 A1 | 8/2003 | Yokoyama | |
| 2003/0193649 A1 | 10/2003 | Seki | |
| 2003/0214815 A1 | 11/2003 | Ishida et al. | |
| 2004/0004176 A1 | 1/2004 | Liang | |
| 2004/0042212 A1 | 3/2004 | Du et al. | |
| 2004/0062044 A1 | 4/2004 | Kazunari | |
| 2004/0062045 A1 | 4/2004 | Chang | |
| 2004/0080938 A1 | 4/2004 | Holman et al. | |
| 2004/0114250 A1 | 6/2004 | Kato | |
| 2004/0174501 A1 | 9/2004 | Slobodin et al. | |
| 2004/0202007 A1 | 10/2004 | Yagi et al. | |
| 2004/0207816 A1 | 10/2004 | Manabu et al. | |
| 2005/0018141 A1 | 1/2005 | Hosaka | |
| 2005/0094401 A1 | 5/2005 | Magarill | |
| 2005/0134811 A1 | 6/2005 | Magarill | |
| 2005/0174658 A1 | 8/2005 | Long et al. | |
| 2005/0174768 A1 | 8/2005 | Conner | |
| 2005/0174771 A1 | 8/2005 | Conner | |
| 2005/0174775 A1 | 8/2005 | Conner | |
| 2005/0179041 A1 | 8/2005 | Harbers et al. | |

FOREIGN PATENT DOCUMENTS

| | | |
|---|---|---|
| EP | 0 322 070 | 6/1989 |
| EP | 0 493 800 | 7/1992 |
| EP | 0 587 371 | 3/1994 |
| EP | 0 740 178 | 10/1996 |
| EP | 0 795 771 | 9/1997 |
| EP | 0 837 350 | 4/1998 |
| EP | 0 881 514 | 12/1998 |
| EP | 1 003 064 | 5/2000 |
| EP | 1 052 856 | 11/2000 |
| EP | 1 347 653 | 9/2003 |
| EP | 1 357 33 A | 10/2003 |
| EP | 1 363 460 | 11/2003 |
| EP | 1 398 659 | 3/2004 |
| GB | 1 195 547 A | 6/1970 |
| JP | 09-018072 | 1/1997 |
| JP | 10-123512 | 5/1998 |
| JP | 11-231316 | 8/1999 |
| JP | 2000-305040 | 11/2000 |
| JP | 2002-133932 | 5/2002 |
| JP | 2002-177218 A | 6/2002 |
| JP | 2002-184206 | 6/2002 |
| JP | 2003-330109 | 11/2003 |
| JP | 2005-128236 | 5/2005 |
| TW | 531 662 B | 5/2003 |
| WO | WO 95/10731 * | 4/1995 |
| WO | WO 02/48775 A | 6/2002 |

| WO | WO 2002/065184 | 8/2002 |
| WO | WO 2003/56876 | 7/2003 |
| WO | WO 2004/043076 | 5/2004 |
| WO | WO 2004-107751 | 12/2004 |
| WO | WO 2004/109366 | 12/2004 |
| WO | WO 2005/078496 | 8/2005 |

OTHER PUBLICATIONS

U.S. Appl. No. 10/748,653, filed Dec. 30, 2003 Cannon.
U.S. Appl. No. 10/726,225, filed Dec. 2, 2003, Henson.
U.S. Appl. No. 10/726,222, filed Dec. 2, 2003, Henson.
U.S. Appl. No. 10/776,390, filed Feb. 11, 2004, Conner.
U.S. Appl. No. 10/776,152, filed Feb. 11, 2004, Conner.
Secondary Optics Design Considerations for SuperFlux LEDs, application brief AB20-5, Appendix 5A, pp. 5-22.
Steve Paolini, Gerard Harbers, Matthijs Keuper, Lumileds, Light from Silicon Valley, High-Power LED Illuminators in Projection Displays, pp. 1-19.
Gerard Harbers, Wim Timmers, Willem Sillevis-Smitt, LED Backlighting for LCD HDTV, Journal of the SID, Oct. 4, 2002, pp. 347-350.
Steve Paolini, Gerard Harbers, Matthijs Keuper, Lumileds, Light from Silicon Valley, Performance of High-Power LED Illuminators in Projection Displays.
LumiBright Light Engine, Innovations in Optics, Inc, Woburn, Massachusetts.
Laikin, Milton, "Lens Design-Third Edition, Revised and Expanded", Table of Contents, pp. 305-312, Marcel Dekker, New York, 2001.
Jacobson, et al., "Novel Compact Non-Imaging Collectors for LED Arrays", Illumitech, Inc., bjacobson@illumitech.com.
Lumileds Lighting, U.S., LLC, "Power Light Source Luxeon™ Emitter", Document # DW25 (Jul. 25, 2003) pp. 1-12.
Smith, Warren J. "Modern Optical Engineering The Design of Optical Systems", McGraw-Hill Third Edition, (2000) pp. 245-247, 470-474.
Stupp, Edward H. and Brennesholtz, Matthew S. "Projection Displays" Modeling Lumen Throughput "Etendue at a flat surface" John Wiley & Sons, Inc. III Series (1999) p. 244-245.
Laikin, Milton, "Lens Design—Third Edition, Revised and Expanded", Table of Contents, pp. 305-312, Marcel Dekker, New York, 2001.
Melles Griot: "Specifying Laser Diode Optics" Online! 2000, 2002 XP002323875, Section "Focusing Lenses For Fiber Optics" Lines 19-23, Figures 3, 4.
Light Emitting Diodes 2003, Oct. 15-17, 2002, "Optical Design for LED Based Devices" Juan Manuel Teijido, Sony International (Europe) GmbH, Sony Corporate Laboratories Europe.

* cited by examiner

RESHAPING LIGHT SOURCE MODULES AND ILLUMINATION SYSTEMS USING THE SAME

FIELD OF THE INVENTION

The present disclosure relates to reshaping light source modules and illumination systems using the same, which may be used in projection systems. More specifically, the disclosure relates to light source modules including pyramid collectors and illumination systems using at least one such light source module.

BACKGROUND

Illumination systems have a variety of applications, including projection displays, backlights for liquid crystal displays (LCDs) and others. Projection systems usually include a source of light, illumination optics, an image-forming device, projection optics and a projection screen. The illumination optics collect light from a light source and direct it to one or more image-forming devices in a predetermined manner. The image-forming device(s), controlled by an electronically conditioned and processed digital video signal, produces an image corresponding to the video signal. Projection optics then magnify the image and project it onto the projection screen. White light sources, such as arc lamps, in conjunction with color wheels have been and still are predominantly used as light sources for projection display systems. However, recently, light emitting diodes (LEDs) were introduced as an alternative. Some advantages of LED light sources include longer lifetime, higher efficiency and superior thermal characteristics.

One example of an image-forming device frequently used in digital light processing systems is a digital micro-mirror device (DMD). The main feature of a DMD is a rectangular array of rotatable micro-mirrors. The tilt of each mirror is independently controlled by the data loaded into the memory cell associated with each mirror, to steer reflected light and spatially map a pixel of video data to a pixel on a projection screen. Light reflected by a mirror in an ON state passes through the projection optics and is projected onto the screen to create a bright field. On the other hand, light reflected by a mirror in an OFF state misses the projection optics, which results in a dark field. A color image also may be produced using a DMD, e.g., utilizing color sequencing, or, alternatively, using three DMDs, one for each primary color.

Other examples of image-forming devices include liquid crystal panels, such as a liquid crystal on silicon device (LCOS), which are typically rectangular. In liquid crystal panels, the alignment of the liquid crystal material is controlled incrementally (pixel-to-pixel) according to the data corresponding to a video signal. Depending on the alignment of the liquid crystal material, polarization of the incident light may be altered by the liquid crystal structure. Thus, with appropriate use of polarizers or polarizing beam splitters, dark and light regions may be created, which correspond to the input video data. Color images have been formed using liquid crystal panels in the manner similar to the DMDs.

Performance of optical systems, such as illumination optics of a projection system, may be characterized by a number of parameters, one of them being etendue. The etendue, $\epsilon$, may be calculated using the following formula:

$$\epsilon = A * \Omega = \pi * A * \sin^2\theta = \pi * A * NA^2$$

where $\Omega$ is the solid angle of emission or acceptance (in steradians); A is the area of the receiver or emitter, $\theta$ is the emission or acceptance angle, and NA is the numerical aperture. If the etendue of a certain element of an optical system is less than the etendue of an upstream optical element, the mismatch may result in loss of light, which reduces the efficiency of the optical system. Thus, performance of an optical system is usually limited by the element that has the smallest etendue. Techniques typically employed to decrease etendue degradation in an optical system include increasing the efficacy of the system (lm/w), decreasing the source size, decreasing the beam solid angle, and avoiding the introduction of additional aperture stops.

Traditional optics used in illumination systems have included various configurations, but their off-axis performance has been satisfactory only within narrowly tailored ranges. In addition, optics in traditional illumination systems have exhibited insufficient collection characteristics. In particular, if a significant portion of a light source's output emerges at angles that are far from the optical axis, which is the case for most LEDs, conventional illumination systems fail to capture a substantial portion of such light. In addition, although some traditional reflective collimators have acceptable collection characteristics, for example, elliptical and parabolic reflectors, such reflectors are usually characterized by rotationally symmetrical bias. Such a bias generally results in the rounding of the resultant image, as well as in lack of overall correspondence between a point on the light source and a point on the target plane, thus causing loss of order and degradation of etendue. These and other shortcomings prompted complicated designs of optical elements and systems, which involved, e.g., utilization of complicated aspheric surfaces and complex combinations of numerous elements.

SUMMARY

The present disclosure is directed to a light source module, which includes an emitter having a light-emitting surface and a pyramid collector mounted onto the emitter over the emitting surface. The proximal end of the pyramid collector faces the emitting surface, while the distal end of the pyramid collector faces away from the emitting surface. In the appropriate exemplary embodiments of the present disclosure, the proximal end of the pyramid collector is in contact with the light-emitting surface. The dimensions and shape of the proximal end of the pyramid collector can be approximately the same as dimensions and shape of the emitting surface. For example, the proximal and distal ends both may have a generally square shape or the proximal end may have a generally square shape while the distal end has a generally rectangular shape. In some exemplary embodiments, the proximal end of the pyramid collector is fitted around the emitting surface. Also, in some embodiments, the distal end of the pyramid collector has a generally pincushioned configuration.

According to the present disclosure, the pyramid collector may be configured to collect at least about 70 percent of light emitted by the emitter. The distance between the proximal and distal ends of the pyramid collectors constructed according to some exemplary embodiments of the present disclosure is typically about 3 to 5 times longer than a largest diagonal of that collector's distal end. In some exemplary embodiments, the pyramid collector has sides that taper from about 2 to about 6 degrees from the distal to the proximal end. In some other exemplary embodiments, the pyramid collector has sides that taper no more than about 10 degrees from the distal end to the proximal end.

Exemplary light source modules constructed according to the present disclosure may further include a straight rectangular pipe section disposed adjacent to the distal end of the pyramid collector. Where both the straight pipe section and the dome portion are included, the straight pipe portion may be disposed between the dome portion and the pyramid collector. Optionally, the pyramid collector includes a generally disk-shaped flange disposed between the dome portion and the pyramid collector.

The present disclosure is also directed to illumination systems including two or more light source modules, an illumination target and a system of optical elements disposed between the at least one light source module and the illumination target. Each light source module includes an emitter having a light-emitting surface and a pyramid collector mounted onto the emitter over the emitting surface. Each pyramid collector has a proximal end facing the emitting surface and a distal end facing away from the emitting surface. The light source modules can be disposed in an array within a non-radially symmetrical aperture. Where the illumination target is an image-forming device disposed for being illuminated at an angle and has a plurality of mirrors rotatable about a pivot axis, the non-radially symmetrical aperture has a long dimension and a short dimension and is oriented so that the long dimension is aligned with the pivot axis of the mirrors of the image-forming device. Optionally, the light source modules and the system of optical elements can be configured to form a plurality of channels aimed substantially into the illumination target. In such exemplary illumination systems, the light source modules can be disposed tangentially to and along a spherical surface.

In accordance with some exemplary embodiments of the present disclosure, the proximal and distal ends of each pyramid collector both can have a generally square shape or the proximal end of each pyramid collector can have a generally square shape while the distal end of each collector has a generally rectangular shape. The system of optical elements may be configured to image the distal end of each pyramid collector onto the illumination target. In such exemplary illumination systems, images of the emitting surfaces can be substantially superimposed to form an illumination patch, which may substantially fill or overfill the illumination target. Alternatively, images of the emitting surfaces may be closely packed or they may overlap to form such an illumination patch. The shape of at least one of the distal ends of the pyramid collectors may substantially match the shape of the illumination target. The illumination target, for example, may be substantially square or substantially rectangular.

These and other aspects of the light source modules and of the illumination systems of the subject invention will become readily apparent to those of ordinary skill in the art from the following detailed description together with the drawings.

BRIEF DESCRIPTION OF THE DRAWINGS

So that those of ordinary skill in the art to which the subject invention pertains will more readily understand how to make and use the subject invention, exemplary embodiments thereof will be described in detail below with reference to the drawings, wherein.

DETAILED DESCRIPTION

Figure 1:
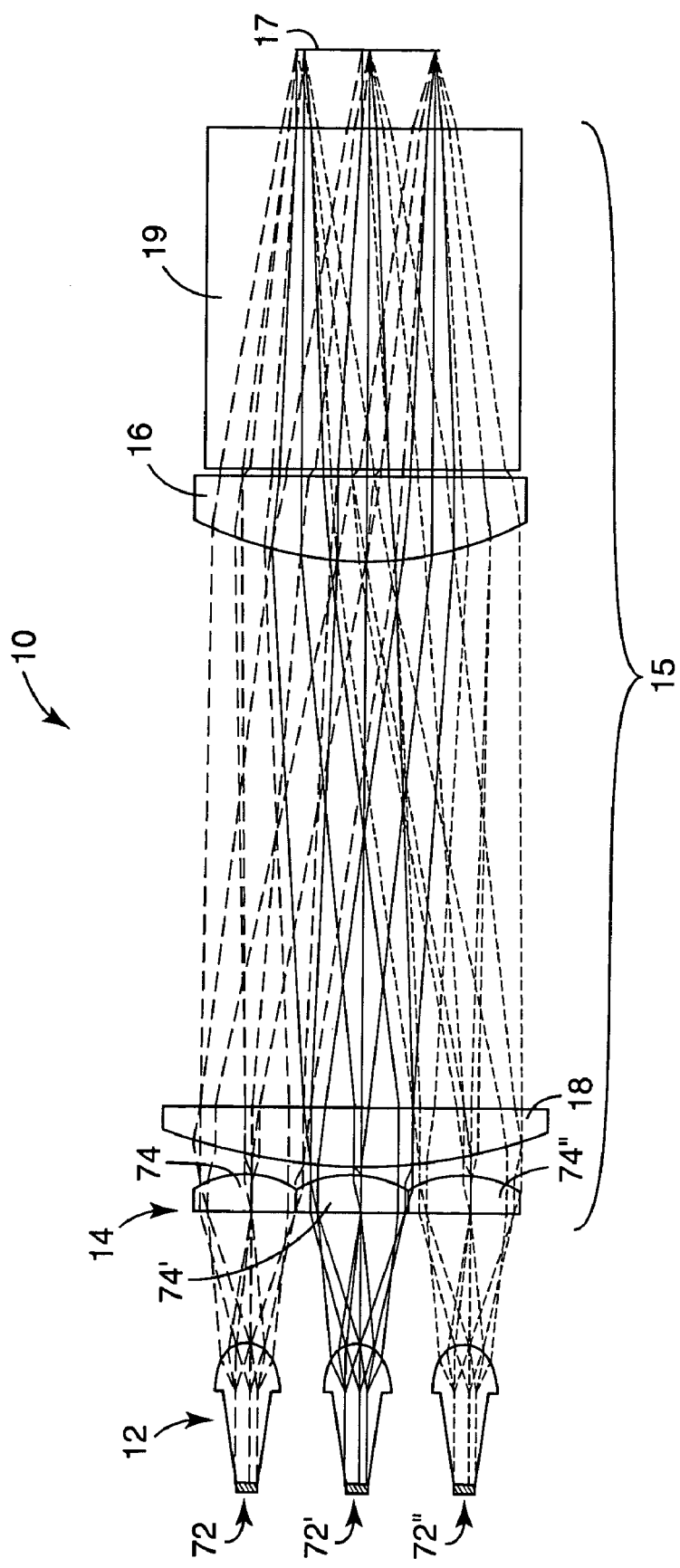
FIG. 1 is a schematic cross-sectional view of an illumination system constructed according to an exemplary embodiment of the present disclosure.

Referring now to the drawings, wherein like reference numbers designate similar elements, FIG. 1 shows schematically an exemplary embodiment of the illumination systems of the present disclosure, which may be used for projection applications. The illumination system 10 shown in FIG. 1 includes a set of light source modules 12, illustrated by the light source modules 72, 72', 72", and a system of optical elements 15. One or more light source modules may include an LED light source. Those of ordinary skill in the art will appreciate that as LEDs with increased efficiency and output are developed and perfected, such LEDs will be advantageously used in exemplary embodiments of the present disclosure, since LEDs with high maximum output are usually preferred. Alternatively, organic light emitting diodes (OLED), vertical cavity surface emitting lasers (VCSEL) or other suitable light emitting devices may be used.

The set of light source modules 12 may be configured as an array, such as a linear, a cartesian or a hexagonal array. The light source modules, such as 72, 72', 72", may be mounted on one or more substrates, together or individually, so that the heat generated by the light source modules may be readily dissipated by the material of the substrate(s) or by other means. Examples of substrates suitable for mounting the light source modules include printed circuit boards, such as metal-core printed circuit boards, flexible circuits, such as polyimide film with copper traces, ceramic substrates, and others. Those of ordinary skill in the art will appreciate that many configurations of the set of light source modules 12 and of the individual light source modules, such as 72, 72', 72", are within the scope of the present disclosure. In addition, the number and type of light source modules may vary depending on the application, desired system configuration, dimensions of the system, and the system's output brightness.

In the exemplary embodiments illustrated in FIG. 1, the system of optical elements 15 includes a set of lenses 14, exemplified by the lenslets 74, 74', 74", a condenser 18, a field lens 16 and other optical elements 19, such as a TIR prism. Similar to the number of light source modules, the number of lenslets in the set 14 may vary depending on the application, the desired system configuration and the desired dimensions of the system. In the appropriate embodiments of the present disclosure, each light source module has an optical element or elements associated with it in order to facilitate collection of light and to achieve the desired imaging characteristics. A light source module and optics associated with it will be collectively referred to herein as a "channel."

For example, in the exemplary embodiments illustrated in FIG. 1, lenslet 74 is associated with the light source module 72, lenslet 74' is associated with the light source module 72', and lenslet 74" is associated with the light source module 72". The lenslets of the set 14 are preferably plano-convex, and the convex surface may be made aspheric in order to reduce aberrations and to avoid the resulting loss of light. Nonetheless, those of ordinary skill in the art will readily appreciate that the overall shape and size of the lenslets may vary depending on the specific application, configuration of the system, the system's size and cost considerations. The material of the lenses is preferably acrylic, but polycarbonate, polystyrene, glass or any other suitable material may be used as well. In general, materials with higher indexes of refraction are preferred, but ultimately the choice will be made depending on the factors important for a particular application, such as cost, moldability, ease of refractive index matching with optical glues or epoxies, etc. In the appropriate embodiments of the present disclosure, the set of lenses 14 may be altogether omitted from the system of optical elements 15, so that the light source modules would share the same optics.

In some exemplary embodiments, the system of optical elements may include the condenser 18, which may be or may include a plano-convex lens. Alternatively, the condenser may be or may include a meniscus lens in order to reduce aberrations, or any other type of lens or lenses depending on the desired characteristics of the output light. The system of optical elements 15 may include other components in addition to or in place of the condenser 18, as may be useful for a particular application, for example it may include dichroic mirrors for separating or combining light beams of different colors, or other separators or combiners.

Referring further to FIG. 1, the nature of the illumination target 17 will vary depending on the specific application. For example, the illumination target 17 may be an entrance to a light tunnel. Light tunnels suitable for use with the appropriate exemplary embodiments of the present disclosure are described, for example, in U.S. Pat. Nos. 5,625,738 and 6,332,688, the disclosures of which are hereby incorporated by reference herein to the extent they are not inconsistent with the present disclosure. A light tunnel would serve to homogenize the output of the light emitting modules, such as 72, 72', 72," and it may be a mirror tunnel, usually rectangular, solid or hollow, or an elongated tunnel composed of a solid glass rod that relies on total internal reflection to transfer light through it. Those of ordinary skill in the art will appreciate that numerous shape combinations for the input and output ends of the light tunnels are possible. In other exemplary embodiments, the illumination target 17 may be an image-forming device, e.g., a DMD or an LCOS.

Figure 2A:
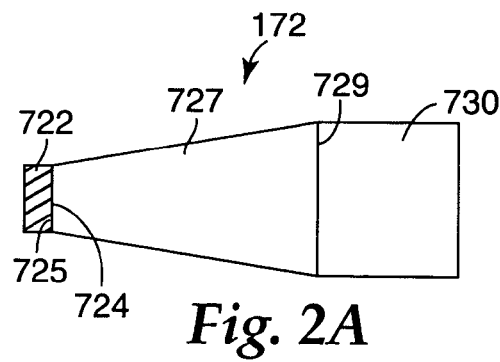
FIG. 2A is a schematic side view of a light source module constructed according to an exemplary embodiment of the present disclosure.
Figure 2B:
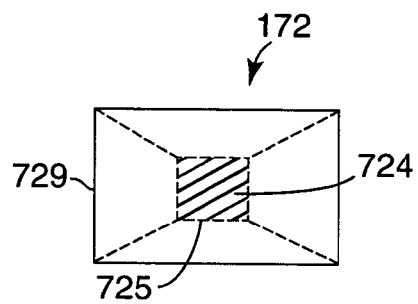
FIG. 2B is a schematic front view of the exemplary light source module shown in FIG. 2A.
Figure 2C:
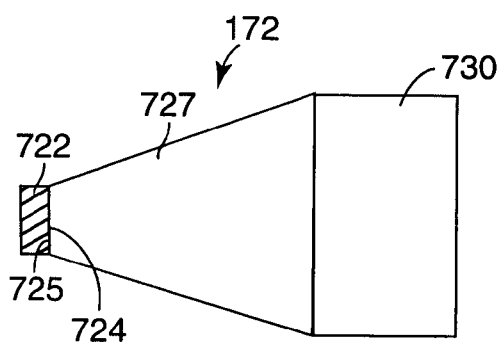
FIG. 2C is a schematic top view of the exemplary light source module shown in FIGS. 2A and 2B.

FIGS. 2A–2C show schematically an exemplary configuration of a light source module suitable for use in the appropriate embodiments of the present disclosure. In particular, FIGS. 2A–2C show a light source module 172, with FIG. 2A being a side view, FIG. 2B being a front view, and FIG. 2C being a top view. The light source module 172 includes an emitter 722 having an emitting surface 724 and a short pyramid collector 727 mounted on the emitter over the emitting surface 724. The short pyramid collector 727 preferably is a substantially optically clear article, for example made of acrylic, polycarbonate or another suitable material, the sides of which operate as simple reflectors for the light emanating from the one or more emitting surfaces at angles that are sufficiently large to result in total internal reflection of such light within the pyramid collector. Those of ordinary skill in the art will readily appreciate that light collection efficiency will be improved for pyramid collectors made of materials with higher refractive indexes.

The emitting surface 724 may be or may include an emitting surface or surfaces of an LED, a layer of phosphor, or any other emissive material. Those of ordinary skill in the art will understand that the term "emitting surface" may be used to refer to any light-emitting surface of a light source module, such as any surface portion of a light-emitting semiconductor layer or chip encapsulated into substantially optically clear material. If the emitting surface 724 is an emitting surface of an LED (which may include several emitting stripes) the pyramid collector 727 preferably is placed over the emitting surface or surfaces and attached to the LED by a suitable substantially optically clear cementing material or molded directly onto it, so that it is in contact with and covers the entire emitting surface or the multiple emitting surfaces of the LED. Minimization or removal of an air gap between the emitting surface of an LED and the pyramid collector typically enhances collection efficiency. The refractive index of the cementing material should be selected depending on the refractive index of the material of the pyramid collector. If the refractive index of the cementing material is higher than the refractive index of the pyramid collector material, a significant portion of emitted light may be lost due to reflections at their interface. Thus, preferably, the refractive index of the cementing material substantially matches or is slightly lower than the refractive index of the pyramid collector, in order to facilitate more efficient light collection.

As it is shown in FIGS. 2A–2C, the pyramid collector 727 of this exemplary embodiment has a generally square proximal end 725 facing the emitting surface 724 and a generally rectangular distal end 729 facing away from the emitting surface 724. For an emitter with the generally square outer shape of the emitting surface, with a side of about 1 mm, such as the active surface of an InGaN LED, one example of suitable dimensions of the pyramid collector 727 includes a generally square proximal end 725 with the side of about 1 mm, a generally rectangular distal end 729 of about 4.3 mm by about 2.4 mm, and the height of the pyramid collector (the distance between the proximal and distal ends) of about 5 to about 15 mm. The shape of the distal end, including the aspect ratio, preferably is matched to the shape of the illumination target 17, shown in FIG. 1.

Optionally, the light source module 172 may include a straight rectangular pipe section 730 added onto the pyramid collector 727. The pipe section 730 may be molded from acrylic, polycarbonate or another suitable plastic material. The dimensions of the cross-section of the pipe 730 preferably substantially match the dimensions of the distal end 729 of the pyramid collector 727, while a suitable length of the pipe section 730 is about 1 to about 2 mm, or in some exemplary embodiments even up to about a half of the total length of the light source module 172. Generally, the length of the pipe section would be selected based on the desired degree of homogeneity of the output illumination, dimensions of the pyramid collector and other factors, such as the desired total length of the light source module. For example, in one exemplary embodiment including the pipe section 730, the generally square proximal end 725 of the pyramid collector 727 is about 1.0×1.0 mm in size to match a similarly sized emitting surface, the distal end 729 is generally rectangular with the size of about 4.3 by about 2.5 mm, the distance between the proximal and distal ends of the pyramid collector 727 is about 5 mm, and the length of the rectangular pipe section 730 is about 2 mm.

Figure 3A:
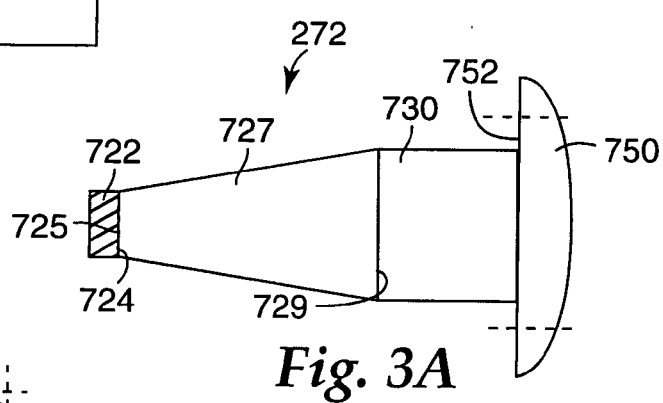
FIG. 3A is a schematic side view of a light source module constructed according to another exemplary embodiment of the present disclosure.
Figure 3B:
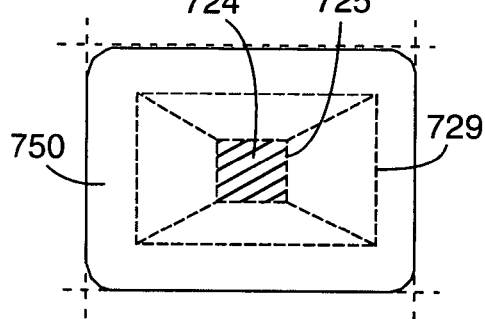
FIG. 3B is a schematic front view of the exemplary light source module shown in FIG. 3A.
Figure 3C:
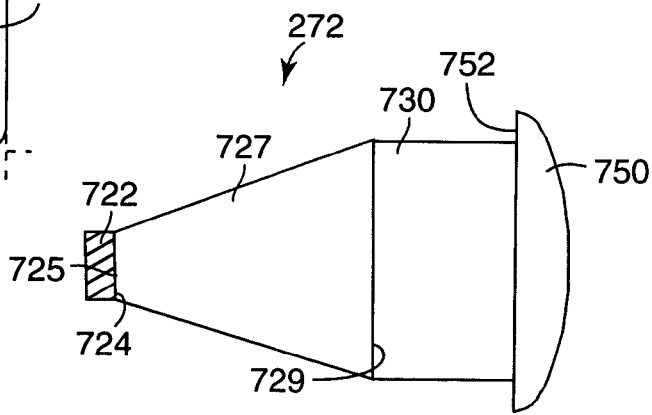
FIG. 3C is a schematic top view of the exemplary light source module shown in FIGS. 3A and 3B.

FIGS. 3A–3C schematically show another exemplary light source module configuration suitable for use in the appropriate embodiments of the present disclosure. The light source module 272 includes an emitter 722 having an emitting surface 724 and a pyramid collector 727 mounted on the emitter 722 over the emitting surface 724. If the emitting surface 724 is an emitting surface of an LED (which may include several emitting stripes) the pyramid collector 727 preferably is placed over the emitting surface or surfaces and attached to the emitter 722 by a suitable substantially optically clear cementing material or molded directly onto it, so that it covers the entire emitting surface 724 or the multiple emitting surfaces of the emitter 722.

Similarly to the light source module 172 shown in FIGS. 2A–2C, the pyramid collector 727 of this exemplary light source module has a generally square proximal end 725 facing the emitting surface 724 and a generally rectangular distal end 729 facing away from the emitting surface 724. Optionally, the light source module 272 also may include a straight rectangular pipe section 730 added onto the pyramid collector 727. The dimensions of the light source module 272 are typically approximately the same as the exemplary dimensions of the light source modules described in reference to FIGS. 2A–2C.

Additionally, the exemplary light source module shown in FIGS. 3A–3C includes a dome portion 750, the convex surface of which, for example, is a generally spherical surface with the radius of curvature of about 4 to about 5 mm. The dome portion 750 aids in compressing the output of the preceding structures into a tighter range of angles. Depending on whether the light source module includes the rectangular pipe section 730 after the pyramid collector 727, the dome portion 750 may be attached to the distal end 729 of the pyramid collector 727 or to the rectangular pipe section 730. The dome portion may be truncated to substantially approximate the dimensions of the element it is attached to, or excess material may be left beyond the collection path to form a mounting rim 752. The passive elements of the light source modules, such as the pyramid collector with the dome, the pyramid collector with the straight pipe and the dome, or the pyramid collector with the straight pipe, may be molded as one unit or they may be fabricated separately and subsequently assembled together.

Figure 4:
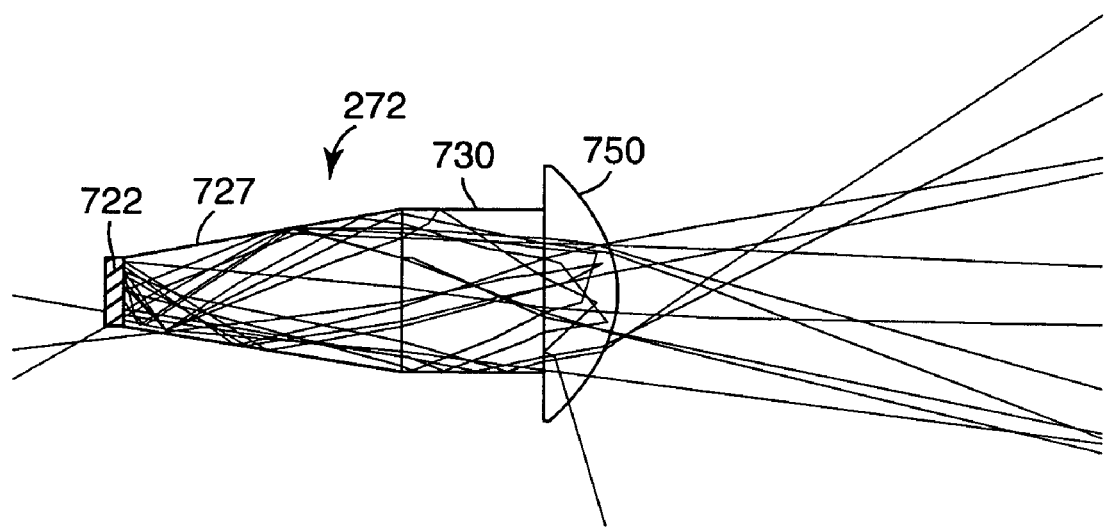
FIG. 4 represents a ray trace schematically illustrating the collection of light within a light source module similar to the exemplary light source modules represented and described in reference to FIGS. 3A–3C.

FIG. 4 represents a ray trace schematically illustrating the collection of light within a light source module similar to that represented and described in reference to FIGS. 3A–3C. Here, the light is collected from an InGaN LED with a generally square emitting surface. Generally, in the appropriate embodiments of the present disclosure, collection efficiency from the nearly lambertian emitting surface of an LED will be relatively high, because a large portion of the light is reflected by means of total internal reflection and kept within the pyramid collector. However, a small portion of light will evade collection, including the rays that are nearly perpendicular to the optical axis and some rays that are reflected back toward the emitter. As a result, as much as about 70%, or in some embodiments about 82% or more, of the emitter's output is collected into the pyramid collector 727 and associated elements, such as the pipe section 730 and the dome portion 750, and the result is illumination with a substantially uniform approximately rectangularly-shaped cross section, with relatively narrow angular extent and relatively high collection efficiency.

Figure 5:
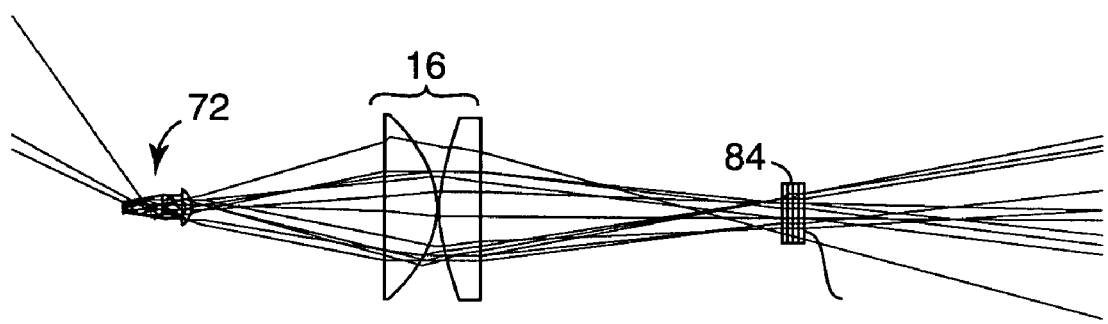
FIG. 5 is a schematic representation of a testing configuration for determining the shape of illumination exiting light source modules constructed in accordance with exemplary embodiments of the present disclosure.
Figure 6:
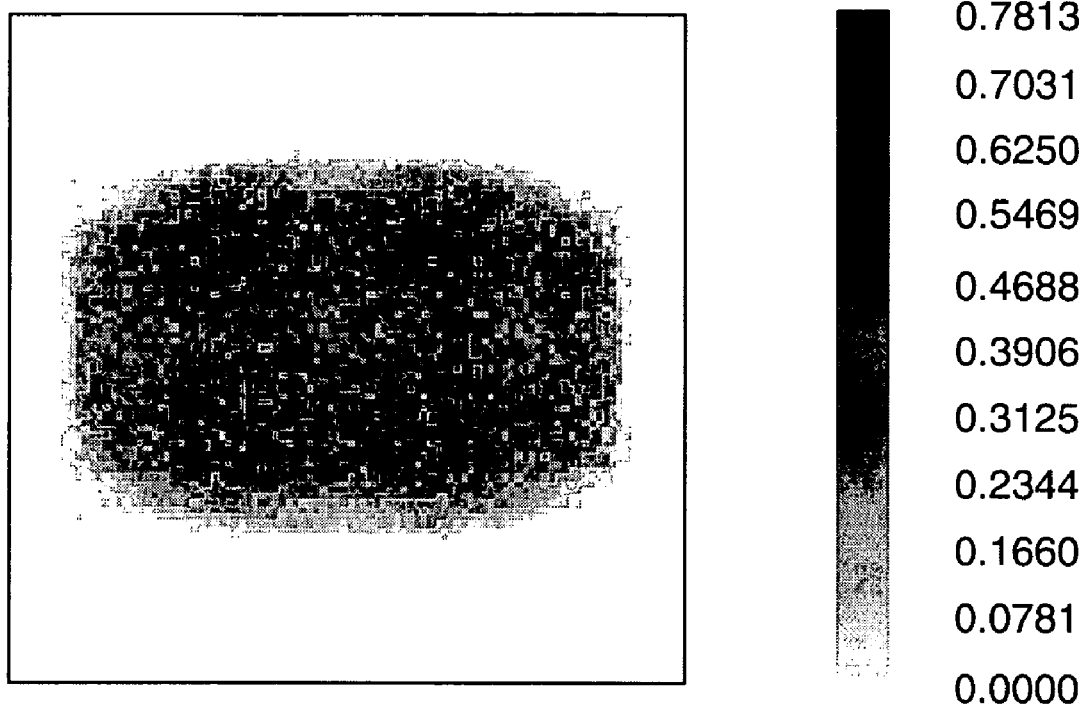
FIG. 6 represents the output irradiance of a light source module shown in and described in reference to FIGS. 3A–3C, when it is tested using the system of FIG. 5.

FIG. 5 represents a computer-simulated testing configuration for determining the shape of illumination exiting a light source module 72. The testing configuration includes imaging optics 16 for focusing the illumination exiting the light source module 72 onto an array detector 84 disposed at the illumination target plane. FIG. 6 represents the simulated output image produced by the detector 84, showing the output irradiance of the light source module 272 when it is tested using the system of FIG. 5. The light source modules can be combined and their output superimposed to increase output illuminance with commensurate increase in angular extent.

Although the exemplary configurations described in reference to FIGS. 2A–2C and 3A–3C work well for most applications and may be preferable in view of various considerations, such as lower cost of some exemplary embodiments, one can see from FIG. 6, that although the simulated image of the output of the light source module 272 looks generally rectangular, the imaging optics 16 relay the image with some barrel distortion. Such distortion may cause the illumination patch to underfill the corners of a rectangular illumination target.

Figure 7:
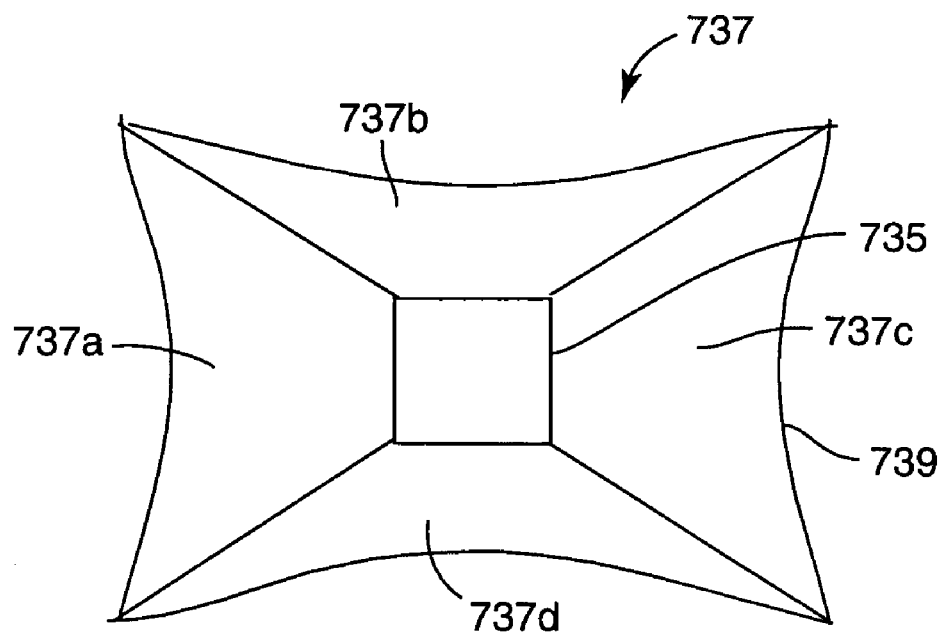
FIG. 7 is a schematic view of a light source module constructed according to another exemplary embodiment of the present disclosure, illustrating a pincushioned configuration.

To counteract barrel distortion, the pyramid collector with generally flat walls, such as the pyramid collector 172 or 272 (FIGS. 2A–3C), can be reshaped to arrive at a pincushioned shape, such as the shape shown in FIG. 7. FIG. 7 schematically illustrates a pyramid collector 737 having a generally square proximal end 735 and a pincushioned distal end 739. The sides 737a, 737b, 737c and 737d of the pyramid collector 737 are shaped as cylindrical, elliptical or generally conical surfaces. The pyramid collector 737 may be molded from acrylic, polycarbonate or any other suitable material, in the shape shown in FIG. 7. Alternatively, the appropriately shaped cutouts may be made in a pyramid collector initially fabricated with straight walls.

The distal end 739 of the pyramid collector 737, for example, has the aspect ratio of about 16:9. Other exemplary dimensions of the pyramid collector include about 1.0×1.0 mm square proximal end, about 4.3×2.4 mm distal end, and about 4 mm distance between the proximal and distal ends. Exemplary parameters of substantially cylindrical surfaces include about 3 mm radius on the longer sides and about 1.1 mm radius on the shorter sides. Substantially conical surfaces with about the same radii can be used as well. The pyramid collector 737 is mounted on the emitter over its emitting surface(s). For example, the pyramid collector may be molded over or cemented onto an emitting surface of an LED by substantially optically clear glue, epoxy or another suitable material with a suitably chosen refractive index.

Figure 8:
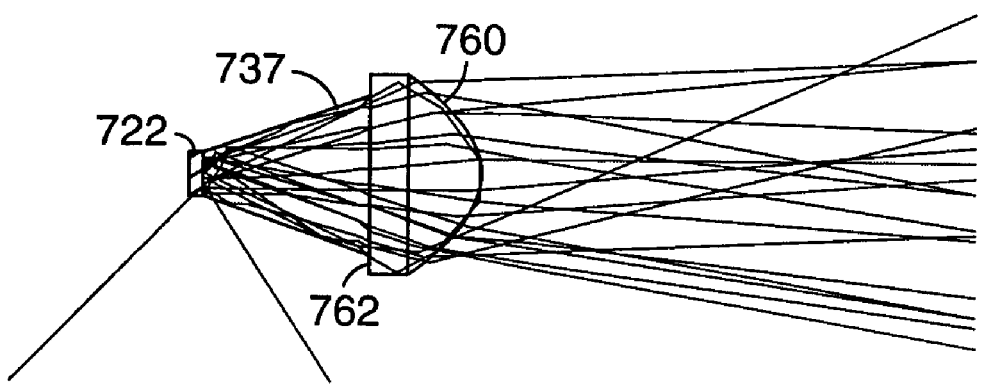
FIG. 8 represents a ray trace schematically illustrating the collection of light within a light source module similar to the exemplary light source modules represented and described in reference to FIGS. 3A–3C and 7.

As shown schematically in FIG. 8, the exemplary light source module 372, including the pincushioned pyramid collector 737 for collecting light from the emitter 722, also includes a dome portion 760, the convex surface of which, for example, is a generally spherical surface having the radius of about 5 mm. The dome portion aids in compressing the output of the preceding structures into a tighter range of angles. The dome portion 760 can be attached to the distal end 739 of the pyramid collector 737 or molded integrally with it, and it may be truncated to substantially approximate the dimensions of the element it is attached to. Alternatively, excess material may be left beyond the collection path to form a mounting rim 762. Preferably, the passive elements of the light source modules, such as the pyramid collector with the dome, are molded as one unit to avoid the need for optical coupling.

FIG. 8 also represents a ray trace schematically illustrating the collection of light within a light source module similar to that represented and described in reference to FIGS. 3A–3C and 7. Here, the light is collected from an InGaN LED with a generally square emitting surface. As mentioned above, in the appropriate embodiments of the present disclosure, the collection efficiency from the nearly lambertian emitting surface of an LED will be relatively high, because a large portion of the light emitted by the emitter is reflected by total internal reflection and kept within the pyramid collector. A small portion of light evades collection, including the rays that are nearly perpendicular to the optical axis and some rays that are reflected back toward the emitter. As a result, as much as about 78% of the emitter's output is collected into the pyramid collector 737 and the dome 760 and relayed to a specified area.

Figure 9:
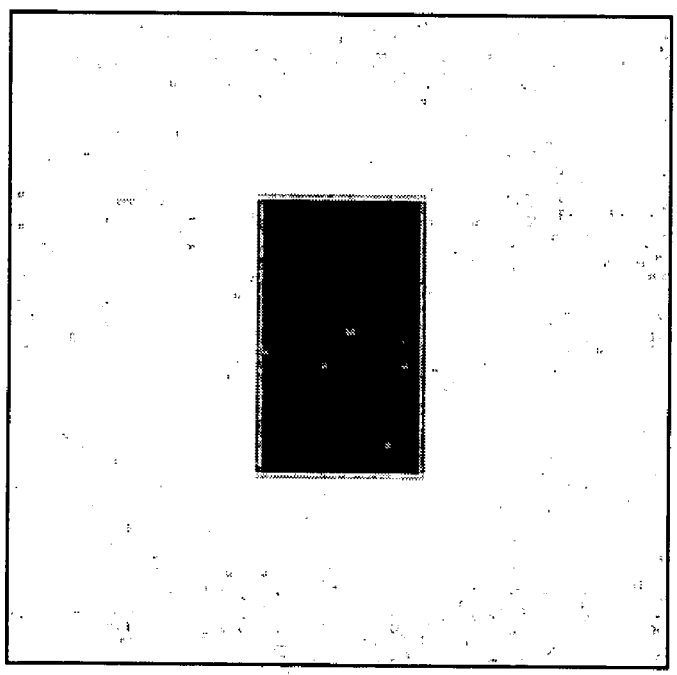
FIG. 9 represents the output irradiance of a light source module shown in and described in reference to FIGS. 3A–3C and 7, when it is tested using the system of FIG. 5.
Figure 9:
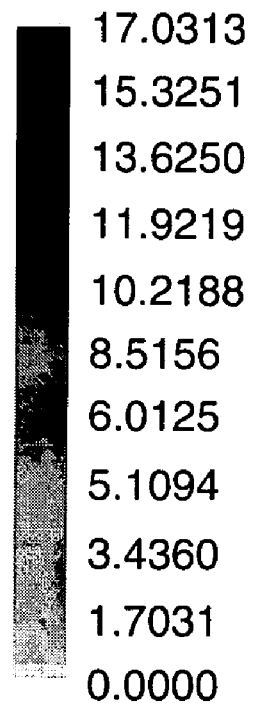

The resulting illumination is a substantially uniform approximately rectangularly shaped cross section with relatively narrow angular extent and relatively high collection efficiency. FIG. 9 represents the simulated output image produced by the detector 84 when the light source module 372 is tested using the simulated testing configuration of FIG. 5. The light source modules can be combined and their output superimposed to increase output illuminance with commensurate increase in angular extent. For example, five to ten light source modules, such as the light source module 737, can be combined to overfill the allowable etendue for a typical microdisplay projection system.

Figure 10A:
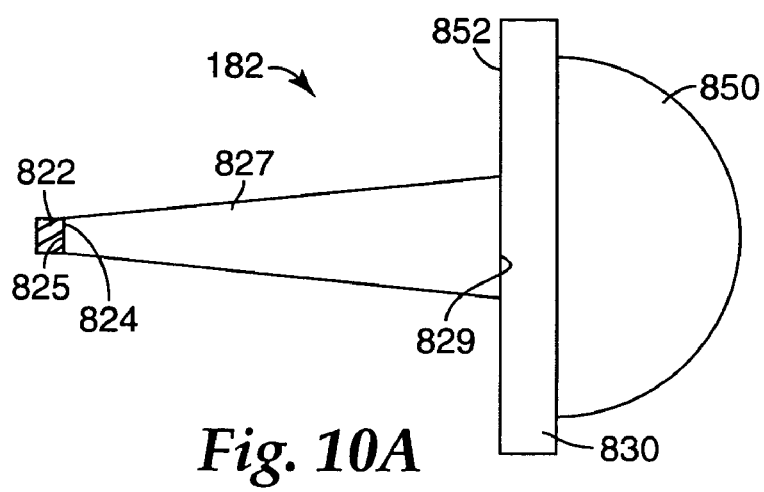
FIG. 10A is a schematic side view of a light source module constructed according to another embodiment of the present disclosure.
Figure 10B:
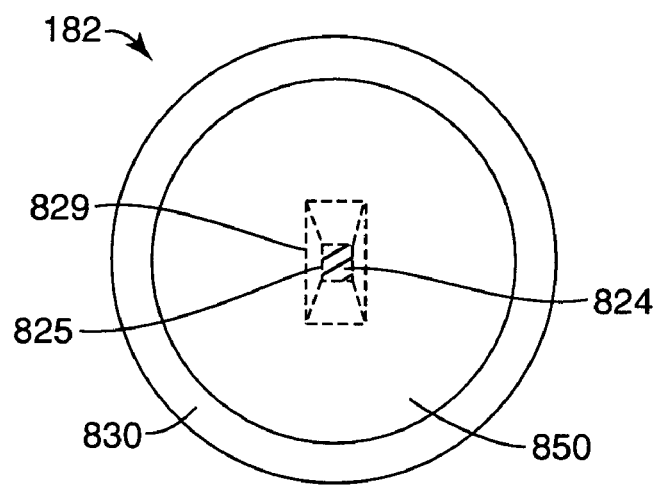
FIG. 10B is a schematic front view of the exemplary light source module shown in FIG. 10A.
Figure 10C:
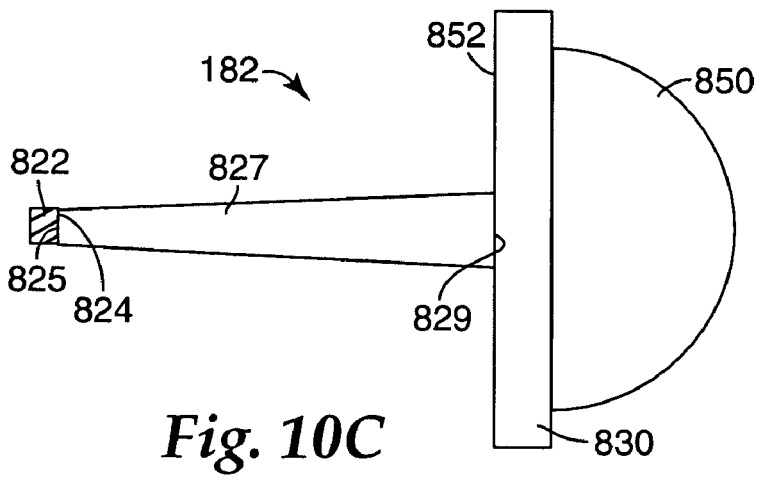
FIG. 10C is a schematic top view of the exemplary light source module shown in FIGS. 10A and 10B.

FIGS. 10A–10C show schematically another exemplary configuration of a light source module suitable for use in the appropriate embodiments of the present disclosure. In particular, FIGS. 10A–10C show a light source module 182, with FIG. 10A being a side view, FIG. 10B being a front view, and FIG. 10C being a top view. The light source module 182 includes an emitter 822 having an emitting surface 824 and a pyramid collector 827 mounted on the emitter 822 over the emitting surface 824. The pyramid collector 827 preferably is a substantially optically clear article, for example made of acrylic, polycarbonate, glass or another suitable material, the sides of which operate as simple reflectors for the light emanating from the one or more emitting surfaces at angles that are sufficiently large to result in total internal reflection of such light within the pyramid collector.

As in other exemplary embodiments of the present disclosure, the emitting surface 824 may be or may include an emitting surface or surfaces of an LED, a layer of phosphor, or any other emissive material. If the emitting surface 824 is an emitting surface of an LED (which may include several emitting stripes) the pyramid collector 827 preferably is disposed over the emitting surface or surfaces and attached to the emitter 822 by a suitable cementing material or molded directly onto it, so that it covers the entire emitting surface 824 or the multiple emitting surfaces of the emitter 822. As explained above, the refractive index of the cementing material should be selected depending on the refractive index of the material of the pyramid collector.

As it shown in FIGS. 10A–10C, the pyramid collector 827 of this exemplary embodiment has a generally square proximal end 825 facing the emitting surface 824 and a generally rectangular distal end 829 facing away from the emitting surface 824. For an emitter with the generally square outer shape of the emitting surface, with a side of about 1 mm, such as the active surface of an InGaN LED, the preferred dimensions of the pyramid collector 827 include a generally square proximal end 825 with the side of about 1 mm, a generally rectangular distal end 829 of about 3.4 mm by about 2 mm, and the height of the pyramid collector (the distance between the proximal and distal ends) of about 12 mm. The shape of the distal end, including the aspect ratio, preferably is matched to the shape or the aspect ratio of the illumination target 17, shown in FIG. 1.

Optionally, the light source module 182 may include a disk-shaped flange 830 added onto the pyramid collector 827. The flange 830 may be molded from acrylic or polycarbonate or another optical plastic material. In some exemplary embodiments including the flange 830, the outer diameter of the flange is about 12 mm and its thickness is about 1.5 mm. Additionally, the exemplary light source module 182 includes a dome portion 850, the convex surface of which, for example, is spherical with the radius of about 5 mm and the outer diameter of about 10 mm. Depending on whether the light source module includes the flange 830, the dome portion 850 may be attached to the distal end 829 of the pyramid collector 827 or to the flange 830. The dome portion may be truncated to substantially approximate the dimensions of the element it is attached to, or excess material may be left beyond the collection path to form a mounting rim 852. Preferably, the passive elements of the light source modules, such as the pyramid collector with the dome or the pyramid collector with the flange and the dome, are molded as one unit, so that there is no need for optical coupling.

Figure 11:
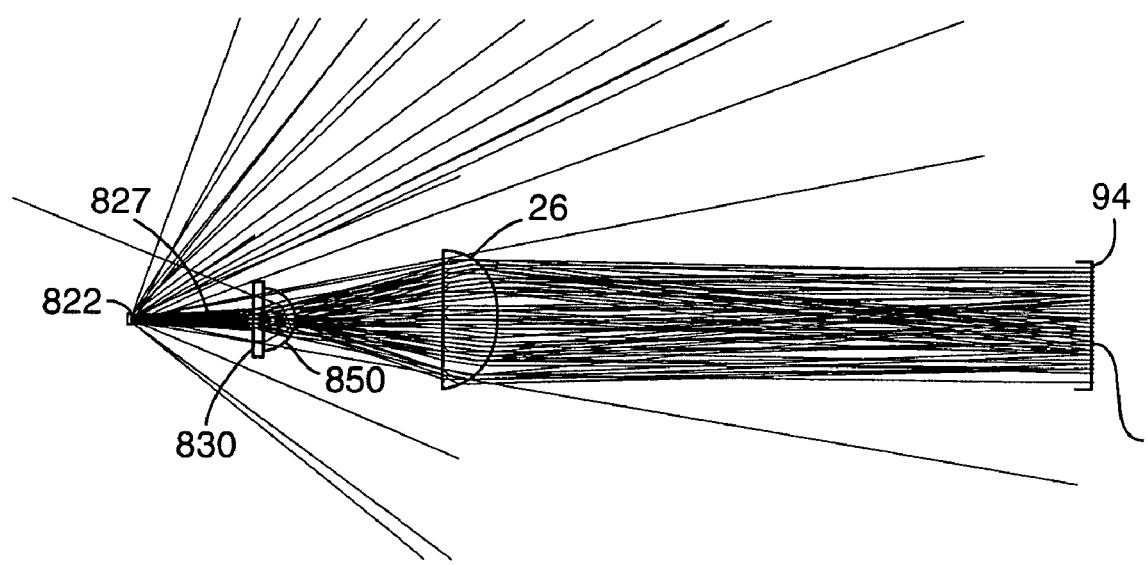
FIG. 11 represents a testing configuration and a ray trace schematically illustrating the collection of light within a light source module similar to that represented and described in reference to FIGS. 10A–10C.

FIG. 11 represents a ray trace schematically illustrating the collection of light within a light source module similar to those represented in and described in reference to FIGS. 10A–10C. Here, the light is collected from an InGaN LED with a generally square emitting surface. As mentioned above, in the appropriate embodiments of the present disclosure, the collection efficiency from the nearly lambertian emitting surface of an LED will be relatively high, because a large portion of the light is reflected by means of total internal reflection and kept within the pyramid collector. A small portion of light evades collection, including the rays that are nearly perpendicular to the optical axis and some rays that are reflected back toward the emitter. As a result, as much as about 80% of the emitter's output is collected into the pyramid collector 827.

Figure 12:
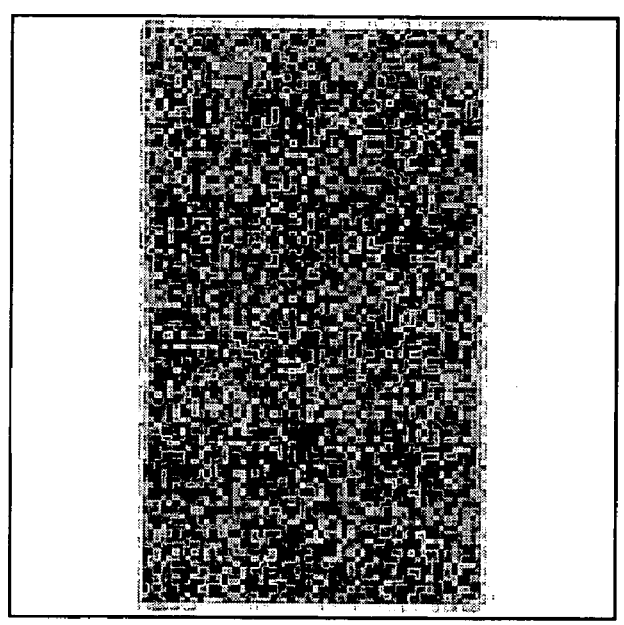
FIG. 12 represents the output irradiance of a light source module shown in and described in reference to FIGS. 10A–10C, when it is tested using the system of FIG. 11.
Figure 12:
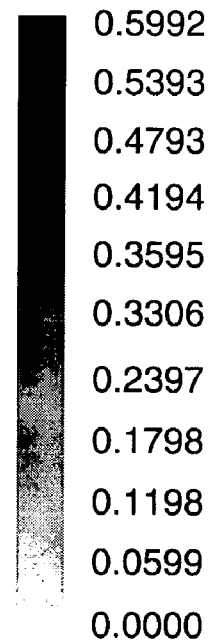

The resulting illumination has a substantially uniform approximately rectangularly shaped cross section with relatively narrow angular extent and relatively high collection efficiency. FIG. 12 represents a simulated output image produced by the detector 94 (see FIG. 11), when the light source module 182 is tested using the simulated testing configuration of FIG. 11, using a focusing lens 26. The focusing lens 26 relays light emanating from the light source module 182 onto the detector 94 disposed at the illumination target plane.

In some embodiments of the present disclosure, the outer dimensions and the shape of the proximal end, for example 725, 735 or 825, preferably-substantially match the dimensions and shape of the emitter and are fitted substantially around the emitting surface or surfaces of the emitter. However, in some embodiments, the dimensions of the proximal ends of the pyramid collectors according to the present disclosure may be larger than and have shapes different from the emitting surfaces. For example, the proximal end can have a generally circular shape that is fitted substantially around a generally rectangular emitting surface. The distal end, such as 729, 739 or 829, is preferably a larger rectangle, for example with the aspect ratio of about 16:9 (which is particularly useful for HDTV applications), 4:3 or another aspect ratio. Alternatively, the distal end may have a generally square shape. In other exemplary embodiments, the distal end may have a generally elliptical shape.

For most applications contemplated by the present disclosure, the distance between the proximal and distal ends of the pyramid collectors constructed according to the present disclosure would be about 3 to 5 times longer than a longer diagonal of its distal end, and the sides of the pyramid collector would be tapered no more than about 10 degrees from the distal to proximal ends, most commonly from about 2 to about 6 degrees. Larger angles are also within the scope of the present disclosure, but such larger angles would typically require a more careful balancing of the desired degree of light mixing within the pyramid collector against the collector's total length. Those of ordinary skill in the art will readily appreciate that a variety of other suitable dimensions and configurations of the pyramid collectors are within the scope of the present disclosure, depending on the dimensions, shape and uniformity of the emitting surface, dimensions and shape of the collecting optics and other relevant system parameters. For example, in some embodiments, the taper angle can be selected depending on the desired total length of the collector, the degree of light mixing in the collector, collection efficiency and other relevant factors.

The use of a pyramid collector, such as pyramid collectors 727, 737 or 827, is particularly advantageous where the emitting surface is an emitting surface of an LED that does not appear sufficiently uniform and/or where a square emitting surface needs to be reshaped, for example, to match a rectangular illumination target. In addition, the pyramid collectors of the present disclosure can collect a relatively large portion of the emitter's output and redirect it so that it would exit the pyramid collector at a smaller range of angles with respect to the optical axis and thus can be easier to collect by the downstream optical elements. Furthermore, the far-field output of the exemplary light source modules including pyramid collectors can form a pattern that may be closely packed (with some overlap, if desired) with others to form a combined illumination patch, which is particularly useful in projection and backlighting applications. Thus, the advantages of using the exemplary embodiments of the present disclosure include improved uniformity of output illumination, ability to reshape the emitting surface from any shape or a collection of shapes to a desired shape, while decreasing the range of output angles without etendue degradation, and maintaining relatively high collection efficiency.

Figure 15:
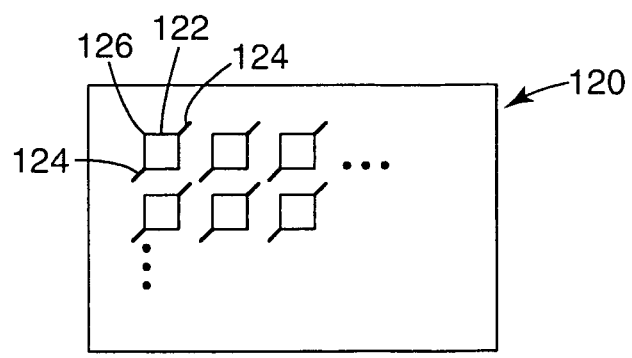
FIG. 15 is a schematic plan view of the surface of a DMD type light valve showing the orientation of the hinges of the individual pixels.

FIG. 15 illustrates a light valve 120 in the form of a deformable mirror device (hereinafter referred to as "DMD") having an array of reflective pixels 122. Each pixel 122 is mounted so as to be pivotable about torsion hinges 124 which are located at two diagonal corners of each pixel 122, thus defining a pivot axis. In operation when an appropriate ON voltage is applied to pixel 122, the upper lefthand corner 126 of pixel 122 Will move upwardly from the plane of the DMD 120 while the lower righthand corner 128 will move downwardly. Similarly, when an OFF voltage is applied, pixel 122 will pivot about torsion hinges 124 so that corner 126 moves downwardly and corner 128 moves upwardly. Thus the ON and OFF positions comprise two distinct movements of each pixel 122. Generally, pixels 122 can be pivoted by 10 degrees to either side of planar. In the ON position, the incident illumination is reflected into the aperture of a projection lens. In the OFF position, the incident illumination is reflected outside the aperture of the projection lens and thus does not reach the viewing screen.

Figure 13:
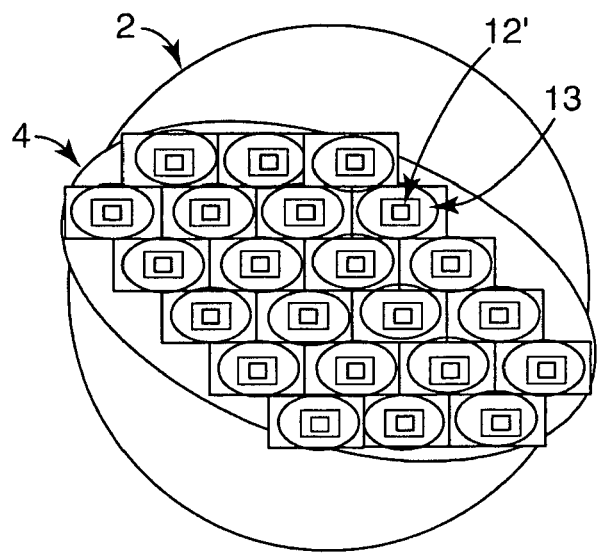
FIG. 13 is a schematic representation of an exemplary configuration of a set of light source modules constructed according to exemplary embodiments of the present disclosure, illustrating positioning the set of light source modules to substantially approximate a non-radially symmetrical aperture.

According to another aspect of the present disclosure, an exemplary configuration of the set of light source modules is illustrated in FIG. 13, which shows a theoretical circular entrance pupil 2 of an illumination system and a non-radially symmetrical aperture 4, representing the entrance pupil formed by appropriately positioning the set of light source modules 12'. This and similar configurations are particularly advantageous in projection systems utilizing one or more DMDs illuminated at an angle and without a light tunnel (described below) being interposed between the light source and the image-forming device. Generally, in such systems there is a strong dependence between the angle of illumination and the amount of light scattered into a projection pupil by reflection from the mirror frame, from beneath the DMD mirrors in OFF states, and from the mirrors in flat or transitional states. Increasing illumination angle increases contrast, but it also causes an offset of the illumination pupil with respect to the projection pupil, introducing vignetting, if the numerical aperture of the projection optics is not increased accordingly. However, if the projection optics' aperture is increased to avoid vignetting, it can collect more flat state or transitional (neither ON nor OFF) reflections and stray light from around the DMD and pass it on to the screen, thus potentially defeating the initial intent of improving contrast.

In the traditional illumination systems utilizing arc lamps, this problem was addressed by placing a truncating aperture stop in the illumination pupil to block at least a portion of the flat state reflections that overlap with the ON state reflections. However, recently, it has been shown that the contrast of DMD projection systems can be enhanced with asymmetric aperture stops. U.S. Pat. No. 5,442,414, the disclosure of which is hereby incorporated by reference herein to the extent it is not inconsistent with the present disclosure, describes contrast-enhancing asymmetric apertures, having long and short dimensions, with the long dimension being aligned with the pivot axis of the mirrors.

Thus, in the appropriate exemplary embodiments of the present disclosure, the configuration of the set of the light source modules 12' may be selected so that the individual light source modules are disposed substantially within the area of the pupil that has the highest contrast, illustrated as the non-radially symmetrical aperture 4, thereby conserving illumination energy and reducing the number of the light source modules used. The configuration of the set of optical elements 13, associated with the light source modules, may be selected accordingly, and preferably will track the configuration of the set of the light source modules 12', so that the latter also would have the general shape substantially approximating a non-radially symmetrical aperture, as illustrated in FIG. 13. Other configurations of the sets of light source modules and the sets of optical elements, for example the set of lenses 14 shown in FIG. 1, are also within the scope of the present disclosure, such as arrays having generally rectangular or square shape, depending on the specific application and other considerations, such as the shape and size of the system, as well as its cost.

Referring further to FIGS. 1, 2A–2C, 3A–3C and 10A–10C, in some exemplary embodiments of the present disclosure, the system of optical elements 15 images one or more of the distal ends of the pyramid collectors, for example, the distal end 729, 739 or 829, onto the illumination target 17. Such imaging approach provides for improved energy transfer from the light source modules to the illumination target. Imaging the distal end of a pyramid collector allows the emitting surface to retain its original shape, such as a square or a collection of stripes for typical commercially available LEDs. The pyramid collector will effectively create a rectangular pattern of light that may then be imaged onto a rectangular illumination target without the need for homogenizing and reshaping by additional optics. In addition, this configuration aids in conserving etendue, because the illumination angles are reduced proportionately to the increase of area from the proximal to the distal ends of the pyramid collector.

If the emitting surface were imaged onto an entrance to a light tunnel, precise imaging would not be necessary. On the other hand, in the embodiments where light tunnels are not used, more precise imaging may be desired. In addition, such embodiments, if used, for example, in projection systems utilizing one or more DMDs, would benefit from arranging the light source modules to approximate substantially the shape of the contrast-enhancing asymmetric aperture, illustrated in FIG. 13.

Referring further to FIG. 1, the system of optical elements 15 may be designed and configured to appropriately magnify the images of the distal end of pyramid collectors. Performance of a typical projection display usually would benefit from, or in some cases even require, a certain amount of overfill of the illumination target by the illumination patch, which in these exemplary embodiments would be formed by the superimposed images of one or more distal ends of the pyramid collectors. For example, for an imaging device of about 20.0×12.0 mm, the illumination patch may be about 10% larger in each axis, or about 22.0×13.4 mm. In some exemplary embodiments, it is desirable to make the amount of overfill substantially the same on all sides, for example, to accommodate mechanical misalignments. In such cases, one or more of the distal ends of the pyramid collectors may be made slightly different in aspect ratio from the illumination target, in order to produce an image of the desired shape. Also, when desired, illumination from emitters having different colors, such as red, green and blue, or other primary colors, may be combined or superimposed with dichroic combiners as would be known to those of ordinary skill in the art.

Figure 14:
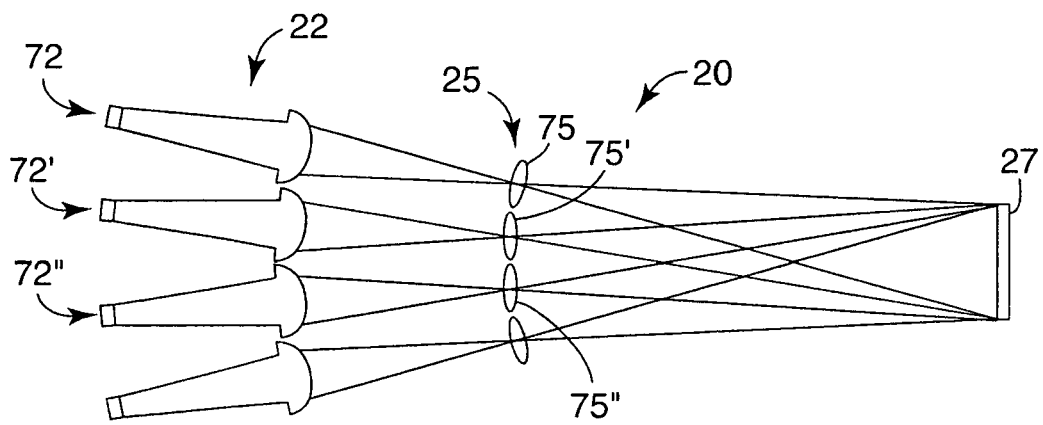
FIG. 14 is a schematic cross-sectional view of an illumination system constructed according to another exemplary embodiment of the present disclosure.

Another group of exemplary embodiments of the illumination systems of the present disclosure is illustrated in FIG. 14. In such exemplary embodiments, the configurations of the systems of optical elements are such that the condenser 18 used in the embodiments illustrated in FIG. 1 may be omitted. Instead, the embodiments illustrated in FIG. 14 utilize one or more individually focusing and aimed-in channels, which include one or more optical elements associated with each light source module, such as one or more lenses, which direct and focus at least a portion of the emission of one or more light source modules onto an illumination target, preferably so that they are superimposed on the illumination target to form an illumination patch. For example, FIG. 14 is a schematic representation of an illumination system 20 including a set of light source modules 22, such as light source modules 72, 72', 72'', and a system of optical elements 25. The set of light source modules 22 is configured so that at least a portion of the emission of each light source module is aimed substantially toward the illumination target 27. This may be accomplished, for example by arranging the set of light source modules 22, such as 72, 72', 72'', tangentially to and along a spherical surface centered at the illumination target.

Referring further to FIG. 14, in some exemplary embodiments of the present disclosure, the system of optical elements 25, exemplified by the lenslets 75, 75'', 75'', etc., may be configured to image one or more distal ends of the pyramid collectors onto the illumination target 27. As explained above, the nature of the illumination target 27 will vary depending on the specific application. Those of ordinary skill in the art will also readily appreciate that the number and type of light source modules and of the optical elements associated with each light source module, thus forming individual aimed-in channels, may vary depending on the application, desired system configuration and the dimensions of the system.

The exemplary embodiments of the present disclosure, wherein light from one or more of the light source modules is focused onto the same illumination target by aiming the individual channels into the target can use fewer parts, can have lower cost, can be more efficient, and in some embodiments can result in brighter output than typical embodiments utilizing shared condensers. However, exemplary embodiments utilizing condensers allow more flexibility, since a condenser may be used to adjust the angle of the output bundle of light, the back focal distance and the magnification. Further, in the exemplary embodiments illustrated in FIG. 14, the light source modules are not co-planar, which is a disadvantage for printed circuit board mounting. On the other hand, if the light source modules are mounted on the same substrate, such as the same printed circuit board, the associated optical elements disposed around the system's periphery can be aimed in or tilted, for example as described in the U.S. application Ser. No. 10/776,152 entitled "Illumination System," filed concurrently herewith and incorporated by reference herein to the extent it is not inconsistent with the present disclosure. Tilting the optical elements may result in decreased luminance as compared, for example, to the system in which the light source modules point toward the center of a sphere and are mounted tangentially to it.

Each of the exemplary embodiments described herein may be particularly advantageous for a specific application. A specific embodiment may be chosen for a particular application based on its optical performance, such as brightness, ease of manufacturing and low cost (molded plastic components), the existing and desired degree of emitting surface uniformity, the amount of reduction in output angles, and amenability to superposition of the modules. The illumination system performance is also usually slightly improved by increasing the number of light source modules, as well as by the use of the "aimed-in" configuration as compared to the exemplary embodiments utilizing shared condensers.

The approach of the present disclosure simplifies designing illumination systems for a variety of specific applications and allows for many different configurations of light source modules, imaging optics and illumination targets. Exemplary embodiments of the present disclosure are capable of collecting light from lambertian-type emitters, such as LEDs, more effectively than traditional systems while preserving etendue. Thus, more light may be transmitted to the illumination target resulting in better overall efficiency. Furthermore, the present disclosure allows the creation of illumination systems that use fewer components, are compact, are versatile, and are easier and less expensive to manufacture.

Although the illumination systems of the present disclosure have been described with reference to specific exemplary embodiments, those of ordinary skill in the art will readily appreciate that changes and modifications may be made thereto without departing from the spirit and scope of the present disclosure. For example, the shape and dimensions of the light source modules may vary. In particular, exemplary light source modules may have additional sections included therein as may be desired for a particular application or for mounting convenience.

On the other hand, dimensions and configurations of the systems of optical elements that are used in various embodiments of the present disclosure can vary depending on the specific application and the nature and dimensions of the illumination target. In addition, the exemplary embodiments of the present disclosure may incorporate optical elements, components and systems described in U.S. application Ser. No. 10/776,152 entitled "Illumination Systems," and U.S. application Ser. No. 10/776,390 entitled "Light-Collecting Illumination System," filed concurrently herewith, the disclosures of which are hereby incorporated by reference herein to the extent they are not inconsistent with the present disclosure. Further, the present disclosure contemplates inclusion of other additional optical elements into exemplary embodiments of the illumination systems constructed in accordance with the present disclosure, as would be known to those of ordinary skill in the art.

Those of ordinary skill in the art will also readily appreciate that embodiments of the present disclosure may be used with a variety of light sources, including white LEDs and color LEDs (e.g., red, blue, green or other colors). RGB LEDs typically will allow achieving the best color performance, but white LEDs are acceptable for many applications.

What is claimed is:

1. A light source module comprising an emitter having a light-emitting surface and a pyramid collector made of a substantially optically clear material mounted onto one emitter over its emitting surface and having sides which operate as simple reflectors for light emanating from the emitting surface at angles that are sufficiently large to result in total internal reflection of such light within the pyramid collector, said pyramid collector having a proximal end facing the emitting surface and a distal end facing away from the emitting surface; wherein the shape and size of the proximal end are different from the shape and size of the distal end, and wherein a geometrical figure having the shape and size of the proximal end can be completely enclosed within a geometrical figure having the shape and size of the distal end.

2. The light source module as recited in claim 1, wherein the proximal end of the pyramid collector is in contact with the light-emitting surface.

3. The light source module as recited in claim 1, wherein the proximal end of the pyramid collector has dimensions and shape that are approximately the same as dimensions and shape of the emitting surface.

4. The light source module as recited in claim 1, wherein the proximal end has a generally square shape and the distal end has a generally rectangular shape.

5. The light source module as recited in claim 1, wherein the proximal end of the pyramid collector is fitted around the emitting surface.

6. The light source module as recited in claim 1, further comprising a straight rectangular pipe section disposed adjacent to the distal end of the pyramid collector.

7. The light source module as recited in claim 1, further comprising a dome portion.

8. The light source module as recited in claim 7, further comprising a straight pipe portion disposed between the dome portion and the pyramid collector.

9. The light source module as recited in claim 7, further comprising a generally disk-shaped flange disposed between the dome portion and the pyramid collector.

10. The light source module as recited in claim 1, wherein the distal end of the pyramid collector has a generally pincushioned configuration.

11. The light source module as recited in claim 1, wherein the pyramid collector collects at least about 70 percent of light emitted by the emitter.

12. The light source module as recited in claim 1, wherein a distance between the proximal and distal ends of the pyramid collector is about 3 to 5 times longer than a largest diagonal of its distal end.

13. The light source module as recited in claim 1, wherein the pyramid collector has sides that taper from about 2 to about 6 degrees from the distal to the proximal end.

14. The light source module as recited in claim 1, wherein the pyramid collector has sides that taper no more than about 10 degrees from the distal to the proximal end.

15. An illumination system, comprising:
a plurality of light source modules, each light source module comprising an emitter having a light-emitting surface and a pyramid collector made of a substantially optically clear material mounted onto one emitter over its emitting surface and having sides which operate as simple reflectors for light emanating from the emitting surface at angles that are sufficiently large to result in total internal reflection of such light within the pyramid collector, each pyramid collector having a proximal end facing the emitting surface and a distal end facing away from the emitting surface; wherein the shape and size of the proximal end are different from the shape and size of the distal end;

an illumination target; and a system of optical elements disposed between the at least one light source module and the illumination target.

16. The illumination system as recited in claim 15, wherein the plurality of the light source modules is disposed in an array within a non-radially symmetrical aperture.

17. The illumination system as recited in claim 16, wherein the illumination target is an image-forming device disposed for being illuminated at an angle and having a plurality of mirrors rotatable about a pivot axis, and wherein the non-radially symmetrical aperture has a long dimension and a short dimension and is oriented so that the long dimension is aligned with the pivot axis of the mirrors of the image-forming device.

18. The illumination system as recited in claim 15, wherein the light source modules and the system of optical elements are configured to form a plurality of channels aimed substantially into the illumination target.

19. The illumination system as recited in claim 18, wherein the light source modules are disposed tangentially to and along a spherical surface.

20. The illumination system as recited in claim 15, wherein the proximal end of each pyramid collector is in contact with the emitting surface of the emitter the pyramid collector is mounted on.

21. The illumination system as recited in claim 15, wherein proximal end of each pyramid collector has dimensions and shape that are approximately the same as dimensions and shape of the emitting surface of the emitter the pyramid collector is mounted on.

22. The illumination system as recited in claim 15, wherein the proximal end of each pyramid collector is fitted around the emitting surface of the light source module the pyramid collector is mounted on.

23. The illumination system as recited in claim 15, wherein each light source module further comprises a straight rectangular pipe section disposed adjacent to the distal end of each pyramid collector.

24. The illumination system as recited in claim 15, wherein each light source module further comprises a dome portion.

25. The illumination system as recited in claim 24, wherein each light source module further comprises a straight pipe portion disposed between the dome portion and the pyramid collector.

26. The illumination system as recited in claim 24, wherein each light source module further comprises a generally disk-shaped flange disposed between the dome portion and the pyramid collector.

27. The illumination system as recited in claim 15, wherein the distal end of each pyramid collector has a generally pincushioned configuration.

28. The illumination system as recited in claim 15, wherein each pyramid collector collects at least about 70 percent of light emitted by the emitter the pyramid collector is mounted on.

29. The illumination system as recited in claim 15, wherein a distance between the proximal and distal ends of each pyramid collector is about 3 to 5 times longer than a largest diagonal of that pyramid collector's distal end.

30. The illumination system as recited in claim 15, wherein each pyramid collector has sides that taper from about 2 to about 6 degrees from the distal to the proximal end of that pyramid collector.

31. The illumination system as recited in claim 15, wherein each pyramid collector has sides that taper no more than about 10 degrees from the distal to the proximal end of that pyramid collector.

32. The illumination system as recited in claim 15, wherein the proximal end of each pyramid collector has a generally square shape and the distal end of each collector has a generally rectangular shape.

33. The illumination system as recited in claim 15, wherein the system of optical elements is configured to image the distal end of each pyramid collector onto the illumination target.

34. The illumination system as recited in claim 33, wherein the images of the emitting surfaces are substantially superimposed to form an illumination patch, said illumination patch substantially filling the illumination target.

35. The illumination system as recited in claim 33, wherein the images of the emitting surfaces are closely packed to form an illumination patch, said illumination patch substantially filling the illumination target.

36. The illumination system as recited in claim 33, wherein the images of the emitting surfaces overlap to form an illumination patch, said illumination patch substantially filling the illumination target.

37. The illumination system as recited in claim 15, wherein a shape of at least one of the distal ends of the pyramid collectors substantially matches a shape of the illumination target.

38. The illumination system as recited in claim 37, wherein the shape of the illumination target is substantially square.

39. The illumination system as recited in claim 37, wherein the shape of the illumination target is substantially rectangular.

* * * * *

UNITED STATES PATENT AND TRADEMARK OFFICE
CERTIFICATE OF CORRECTION

PATENT NO. : 7,246,923 B2
APPLICATION NO. : 10/776155
DATED : July 24, 2007
INVENTOR(S) : Arlie R. Conner It is certified that error appears in the above-identified patent and that said Letters Patent is hereby corrected as shown below:

TITLE PAGE, ITEM (56)
Page 2,
Column 2 (Foreign Patent Documents), Line 11, Delete "1 357 33 A" and insert -- 1 357 333 A --, therefor.

TITLE PAGE, ITEM (56)
Page 3,
Col. 2, (Other Publications), Line 8, Delete "The" and insert -- the --, therefor.

TITLE PAGE, ITEM (56)
Page 3,
Col. 2 (Other Publications), Line 13, Delete "p." and insert -- pp. --, therefor.

Column 4,
Line 61 (approx.), After "aperture;" delete "and".

Column 11,
Line 32, Delete "preferably-substantially" and insert -- preferably substantially --, therefor.

Column 12,
Line 31, After "122" delete "Will" and insert -- will --, therefor.

Column 14,
Line 40, After "75," delete "75'," and insert -- 75', --, therefor.

UNITED STATES PATENT AND TRADEMARK OFFICE
CERTIFICATE OF CORRECTION

PATENT NO. : 7,246,923 B2
APPLICATION NO. : 10/776155
DATED : July 24, 2007
INVENTOR(S) : Arlie R. Conner It is certified that error appears in the above-identified patent and that said Letters Patent is hereby corrected as shown below:

Column 15,
Line 2, After "System,"" insert -- Attorney Docket No. 59373US002, --.
Line 51, After "Systems,"" insert -- Attorney Docket No. 59373US002, --.
Line 53, After "System,"" insert -- Attorney Docket No. 59516US002, --.

Signed and Sealed this

Eighteenth Day of September, 2007

JON W. DUDAS
*Director of the United States Patent and Trademark Office*